United States Patent [19]

Prasad et al.

[11] Patent Number: 5,852,472
[45] Date of Patent: Dec. 22, 1998

[54] METHOD AND APPARATUS FOR CONNECTING VIDEO SOURCES AND VIDEO SINKS

[75] Inventors: Rama R. Prasad; Michael J. Gutmann, both of Hillsboro; Stephen S. Ing, Beaverton, all of Oreg.

[73] Assignee: Intel Corporation, Santa Clara, Calif.

[21] Appl. No.: 535,541

[22] Filed: Sep. 28, 1995

[51] Int. Cl.$^6$ ...................................................... H04N 5/30
[52] U.S. Cl. ......................... 348/552; 348/232; 348/714; 348/719
[58] Field of Search ............................... 348/6, 7, 12, 13, 348/14, 15, 16, 17, 18, 19, 400, 403, 489, 232, 233, 552, 571, 714–721; 364/514, 238.6, 239, 240, 240.2, 241.7; 362/56; 395/200.01, 200, 500, 800

[56] References Cited

U.S. PATENT DOCUMENTS

| | | | |
|---|---|---|---|
| 5,016,107 | 5/1991 | Sasson et al. | 348/232 |
| 5,488,570 | 1/1996 | Agarwal | 364/514 R |
| 5,515,296 | 5/1996 | Agarwal | 364/514 R |
| 5,563,655 | 10/1996 | Lathrop | 348/231 |
| 5,627,825 | 5/1997 | Barraclough et al. | 370/260 |

*Primary Examiner*—Glenton B. Burgess
*Attorney, Agent, or Firm*—Blakely, Sokoloff, Taylor & Zafman

[57] ABSTRACT

A method for creating a video connection between a video source for transmitting frames of video data and a video sink for receiving the frames. The video source may be a file, a camera, a computer network, and a telephony interface. The video sink may be a file, a visual display device, a computer network, and a telephony interface. The video source has a recycle framehandler function for recycling used buffers and the video sink has a process framehandler function for processing received frames. A video stream object is created having data members that include a reference to the video sink and a reference to the video source, as well as several member functions. The member functions are used to query the video sink to obtain a reference to the process framehandler function and to then provide the reference to the video source. The member functions are also used to query the video source to obtain a reference to the recycle framehandler function, which is then provided to the video sink. The reference to the process framehandler function is stored as a data member of a first framehandler object to be used by the video source, and the reference to the recycle framehandler function is stored as a data member of a second framehandler object to be used by the video sink. The video source may then directly invoke the process framehandler function and the video sink may directly invoke the recycle framehandler function.

36 Claims, 10 Drawing Sheets

| SINK / FRAME TYPE | VSINK$_1$ | VSINK$_2$ | ... | VSINK$_N$ |
|---|---|---|---|---|
| FRAME TYPE 1 | FH (1) (1) | FH (1) (2) | ... | FH (1) (N) |
| FRAME TYPE 2 | FH (2) (1) | FH (2) (2) | ... | FH (2) (N) |
| ⋮ | ⋮ | ⋮ | ⋮ | ⋮ |
| FRAME TYPE L | FH (L) (1) | FH (L) (2) | ... | FH (L) (N) |

FIG. 10

METHOD AND APPARATUS FOR CONNECTING VIDEO SOURCES AND VIDEO SINKS

FIELD OF THE INVENTION

The present invention pertains to the field of personal computer video subsystems. More particularly, the present invention relates to connecting video sources and video sinks to allow capturing, playing, transmitting, and receiving multiple video streams in a personal computer video subsystem.

BACKGROUND OF THE INVENTION

Modern personal computer systems are often provided with the capability to transmit, receive, and process video data for use in various applications, such as video teleconferencing and multimedia. This video data can be represented as a sequence of video frames which originate from a "video source" and which are deposited into a "video sink". In a personal computer video subsystem, a video source may be a camera, a previously formatted file or memory, or a computer network or telephony interface. Similarly, a video sink may be a computer monitor display, a file or memory, or a transmission on a computer network or telephony interface. The connection of a video source to a video sink and the means by which video frames are moved from source to sink may be referred to as a "video stream".

Once a video stream is created, it is important that video frames pass from source to sink as efficiently as possible. A video sink has associated with it a processing algorithm which determines how that video sink receives and processes frames. For example, the processing algorithm may specify the type of data compression, color format, frame size, frame rate, and resolution used by that sink. A video sink may support multiple frame types, in which case the sink may have a separate processing algorithm for each frame type it supports. In addition, the video subsystem generally allocates a number of buffers to temporarily store frames that are being moved from source to sink. These buffers are controlled by the sink, in that, once the sink has processed the stored frames, the sink allows the source to store new frames in the buffers by "recycling" the buffers, i.e., temporarily giving possession of the buffers to the source. Once new frames are stored in the buffers by the source, the sink takes back possession of the buffers so that it may process the newly stored frames. The video subsystem provides a recycle algorithm which carries out the process of recycling buffers. Hence, to provide an efficient connection between a video source and a video sink, it is desirable to provide an efficient means for accessing and invoking the processing algorithms and recycle algorithms associated with the video subsystem.

One disadvantage of existing personal computer video subsystems, however, is that they require an intermediate routing mechanism to pass frames between a source and sink. Further, existing video subsystems do not provide capability to route frames from an arbitrary number of video sources to an arbitrary number of video sinks. In addition, existing video subsystems often require copying of frames, such as when a sink is not yet ready to process a received frame. Consequently, it is desirable to provide an efficient and extensible means of connecting one or more video sources to one or more video sinks in a personal computer video subsystem, such that no intermediate routing or copying of frames is required.

SUMMARY OF THE INVENTION

A method is provided for creating a connection between a video source for depositing frames of video data into a video sink. The video source has a recycle framehandler function for recycling used buffers and the video sink has a process framehandler function for processing received frames. The method comprises the steps of: obtaining a reference to the process framehandler function from the video sink; providing the reference to the process framehandler function to the video source; obtaining a reference to the recycle framehandler function from the video source; and, providing the reference to the recycle framehandler function to the video sink. The video source may directly invoke the process framehandler function and the video sink may directly invoke the recycle framehandler function.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for connecting one or more video sources to one or more video sinks is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
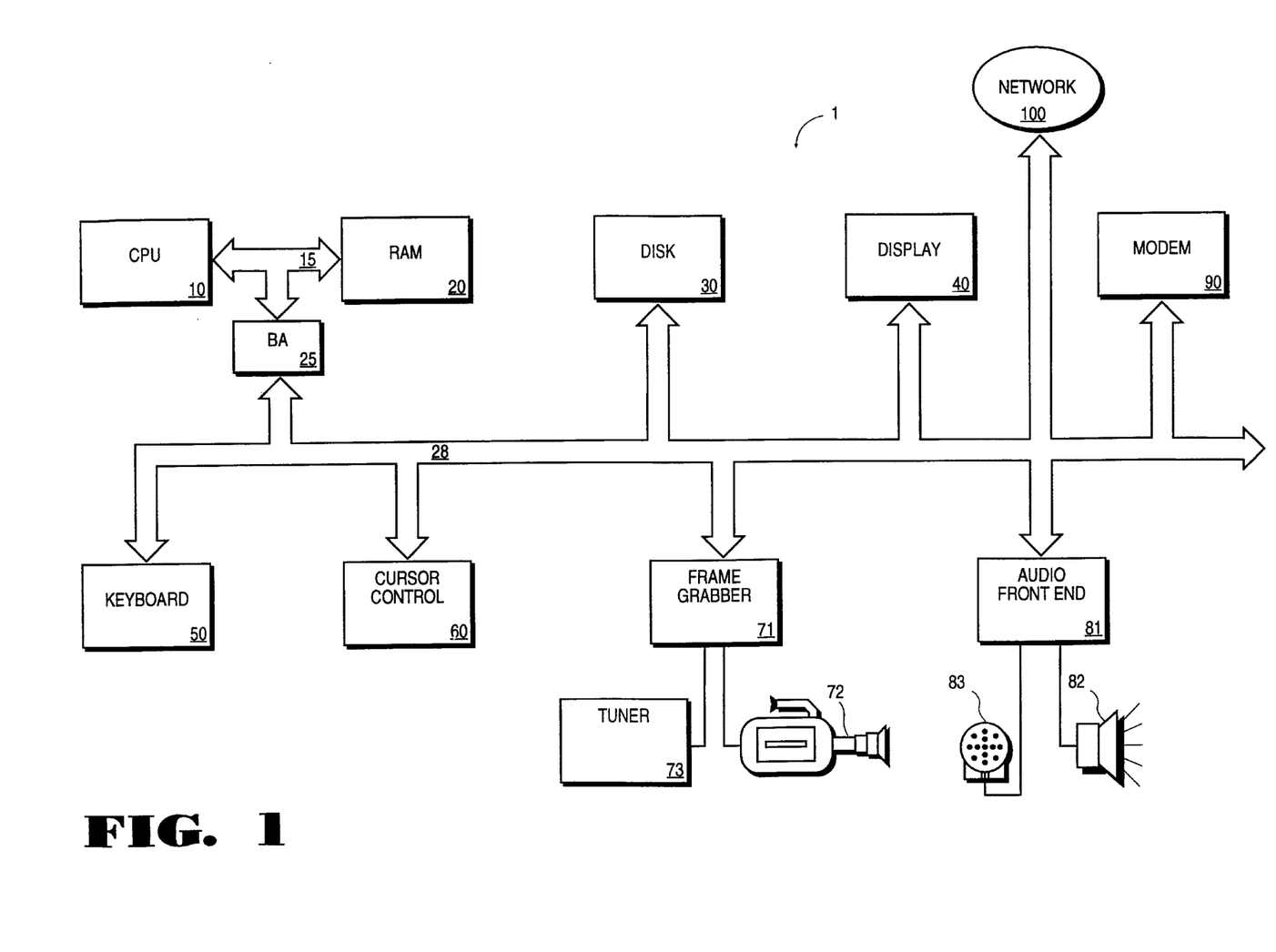
FIG. 1 illustrates a computer system in which the present invention can be implemented.

In the preferred embodiment, the present invention is implemented in video-teleconferencing or multi-media software (referred to in this description as "the video application") within a personal computer system. FIG. 1 illustrates a personal computer system 1 in which the present invention can be implemented. The hardware of computer system 1 comprises a central processing unit (CPU) 10 coupled to random access memory 20 via a system bus 15. The CPU 10 and memory 20 are coupled to various peripheral devices through the system bus 15, a bus adapter 25 and an I/O bus 28. The peripheral devices include a disk drive 30, a visual display 40, a keyboard 50, a cursor control device 60, a video subsystem 70, an audio subsystem 80, and a modem 90. The audio subsystem 80 comprises a speaker 82 and a microphone 83 coupled to the I/O bus 28 through audio front-end circuitry 81. The computer system 1 is coupled to other personal computer systems through a network 100, which may be a local area network (LAN), an integrated services digital network (ISDN), or an equivalent medium capable of supporting video data.

Figure 2:
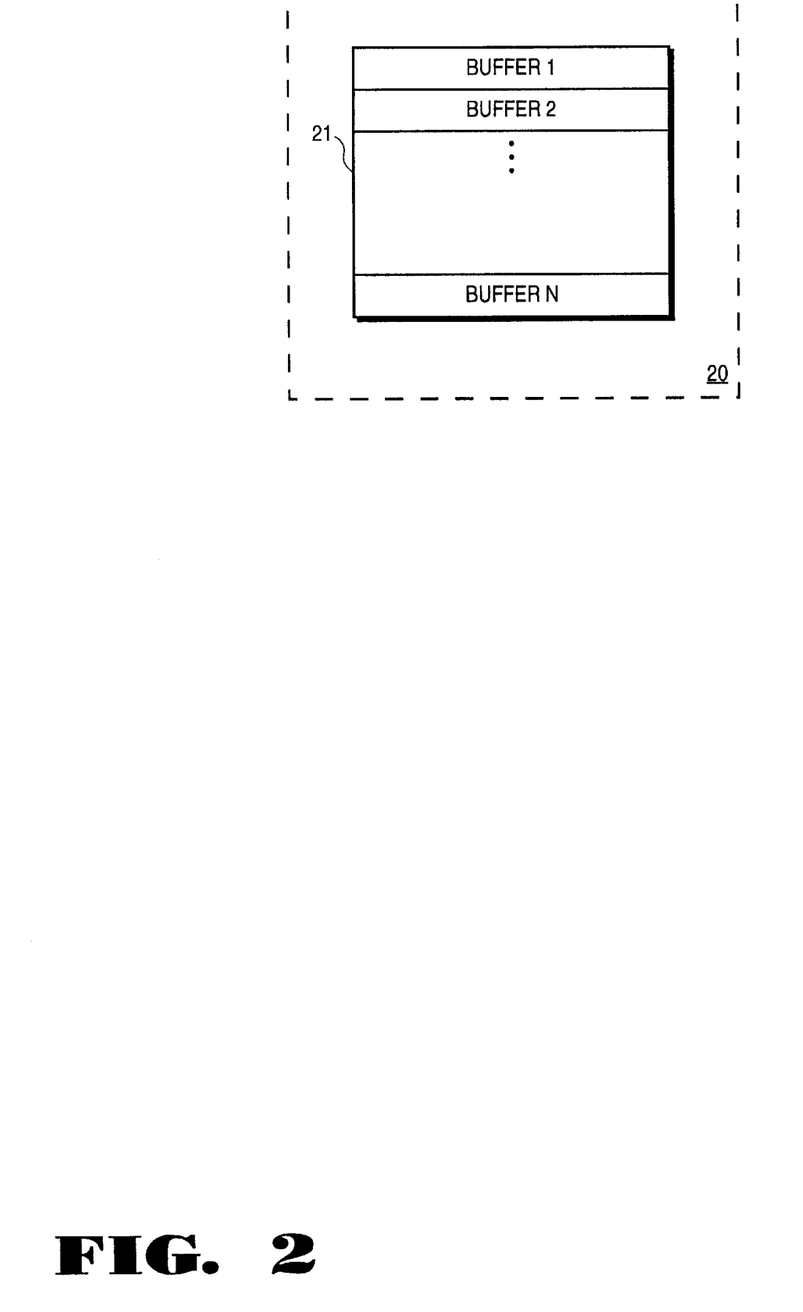
FIG. 2 illustrates a memory containing a plurality of frame buffers.

The video subsystem 70 comprises a television tuner 73 and a video camera 72 providing input to a frame grabber 71 coupled to the I/O bus 28. Video data in the form of multiple individual frames may be input into the computer system 1 through the television tuner 73, through the video camera 72, or through the disk drive 30. The disk drive 30 is a CD-ROM or other equivalent I/O device having sufficient capacity to support video data. Video data which has been input into the computer system 1 may be stored in the form of a file stored on the disk drive 30 and (perhaps) loaded into memory 20. This video data may be transmitted to other personal computer systems over the network 100. Therefore, for purposes of this description, a "video source" may be defined as the tuner 73, the camera 72, a file (which may be loaded into memory 20), or (from the viewpoint of another computer system coupled to computer system 1) the network 100. A "video sink" may be defined as the display 40, a file (which may be loaded into memory 20), or the network 100. The memory 20 comprises a plurality of frame buffers 21 associated with a video source for storing video frames which are to be deposited into a video sink, as shown in FIG. 2.

Figure 3A:
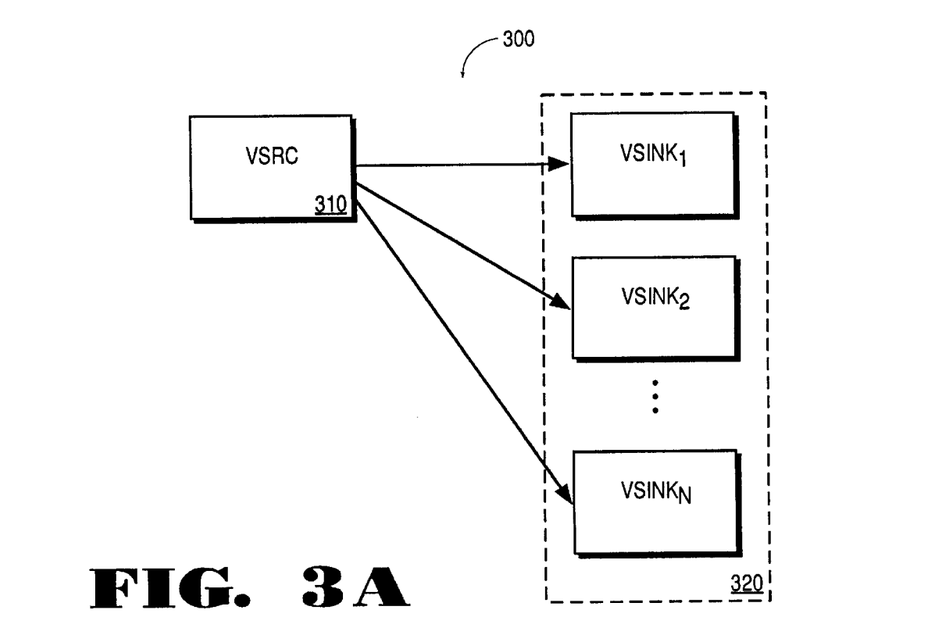
FIGS. 3A, 3B and 3C illustrate three embodiments of a video stream.

Referring now to FIG. 3A, a "video stream" 300 is defined as a connection between a video source 310 and one or more video sinks 320, such that frames of video data may be deposited by the source 310 into any of the sinks 320. In an alternative embodiment, illustrated in FIG. 3B, a video stream 330 may be defined as the connection of multiple video sources 340 to one or more video sinks 350, such that any of the sources 340 may deposit frames into any of the sinks 350. Moreover, a video stream may itself comprise two or more video streams, and video streams may overlap, as illustrated in FIG. 3C. In FIG. 3C, a video stream 360 comprises video stream 365 and video stream 368. Video stream 368 comprises a video source 361 connected to the network 100. The network 100 is also connected to video sink 362 of video stream 368. Hence, the network 100 acts as both the sink of video stream 365 and the source of video stream 368.

Figure 4A:
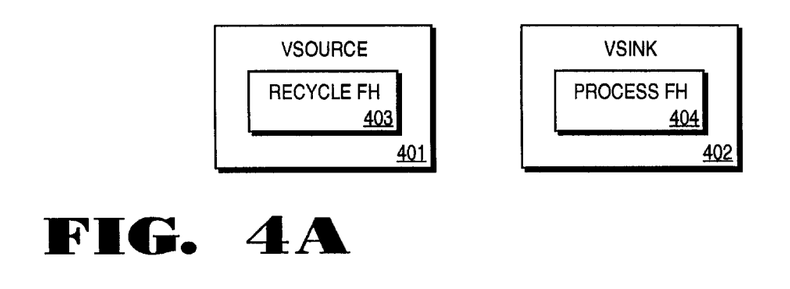
FIG. 4A illustrates objects representing a video source and a video sink.

In the preferred embodiment, the present invention is implemented in an object-oriented programming language, such as C++. This implementation includes several specific classes of objects. Referring to FIG. 4A, a video source may be represented as a video source object 401 which is an instance of a class of video sources, and a video sink may be represented as a video sink object 402 which is an instance of a class of video sinks. Each video source has associated with it a recycle framehandler 403. The recycle framehandler 403 is a function or algorithm for controlling the recycling of the frame buffers 21. Each of the buffers 21 is recycled whenever a frame contained within the buffer is no longer needed by a sink (i.e., has been deposited into every sink which requires that frame). Because more than one sink may require the contents of any one buffer, a video source maintains a reference count for each of the frame buffers 21 corresponding to the number of sinks which require the contents of that buffer. A video frame buffer can be reused when its reference count indicates that the proper number of invocations of the recycle framehandler have occurred.

Each video sink has associated with it at least one process framehandler 404. A process framehandler 404 is a function or algorithm used by a video sink for controlling the processing of frames deposited into the sink 402. A process framehandler 404 may specify, for example, the type of data compression, color format, frame size, frame rate, and resolution used by the sink 402. Each video sink supports at least one frame type. Video frame types can be used to define digital video formats and layouts, such as H.261, YUV16, YUV12, etc. A separate process framehandler 404 is provided for each frame type for each video sink in a video stream.

A connection between a video source and a video sink (i.e., a video stream) is established during initialization of the video subsystem 70. Before the video stream is established, a video source 401 has a valid reference to (address of) its own recycle framehandler 403 but has no valid reference to the video sink's process framehandler 404. Similarly, a video sink 402 has a valid reference to (address of) its own process framehandler 404 but has no valid reference to the source's recycle framehandler 403. As will be discussed in greater detail below, a video connection (video stream) is created by providing the video source 401 with a reference to the process framehandler 404 of the video sink 402, and by providing the video sink 402 with a reference to the recycle framehandler 403 of the video source 401. Once the interface has been defined by providing these references, the source 401 or sink 402 is responsible during run time for directly invoking the process framehandler or the recycle framehandler, respectively, when a frame is to be passed. More specifically, once a video source has a reference to a video sink's process framehandler, the video source invokes the process framehandler to move the frames directly between the video source and the video sink. Once a video sink has a valid reference to a video source's recycle framehandler, the sink can return frame buffers directly to the video source by directly invoking the recycle framehandler.

Figure 3B:
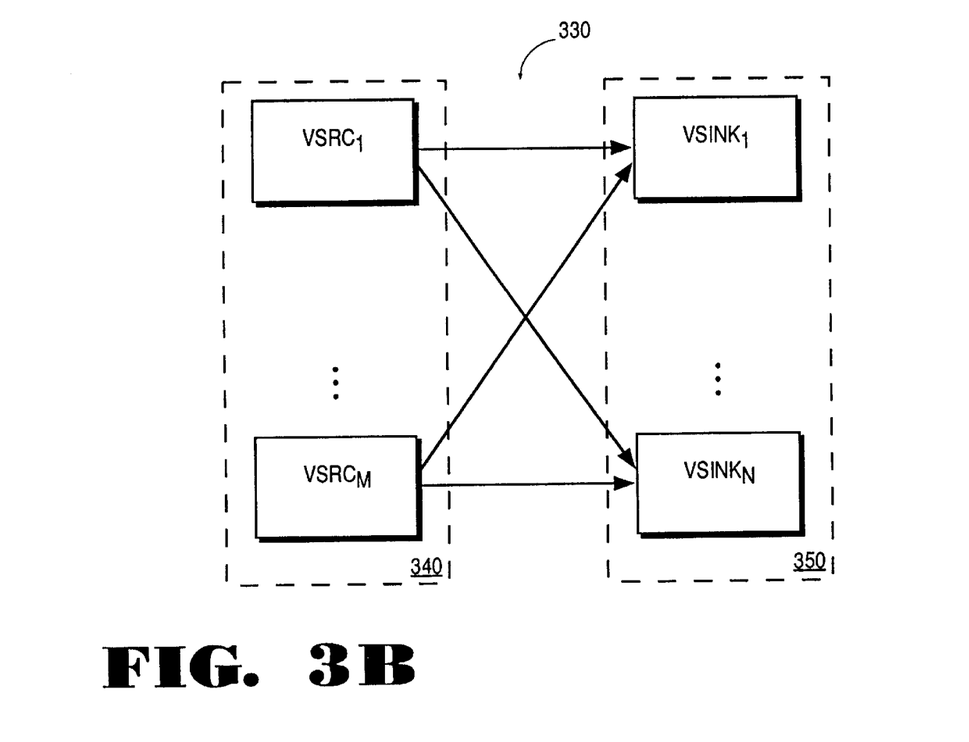
Figure 4B:
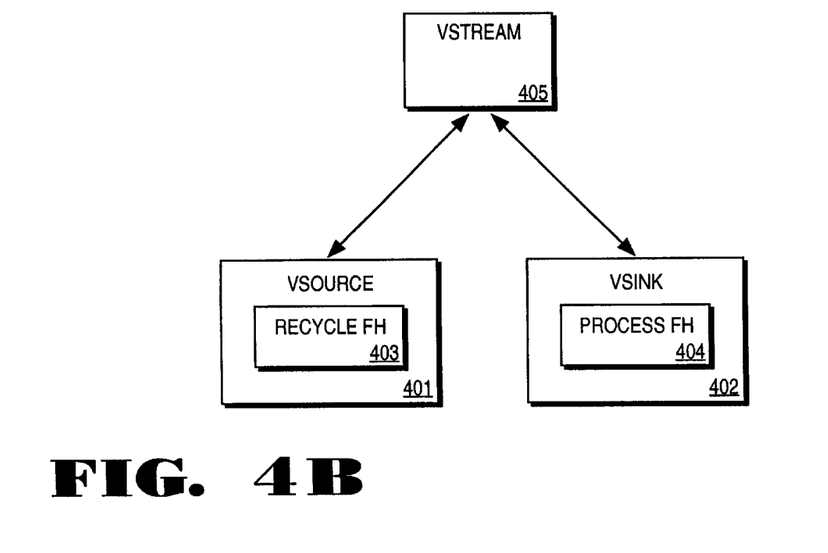
FIG. 4B illustrates a functional relationship between a video stream object, a video source, and a video sink.
Figure 5A:
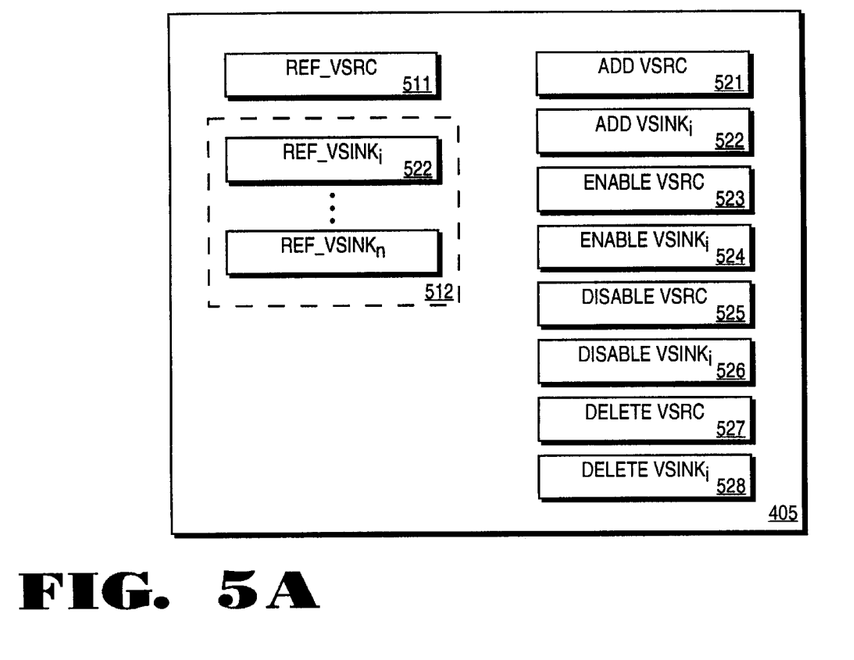
FIGS. 5A and 5B illustrate two embodiments of a video stream object.
Figure 5B:
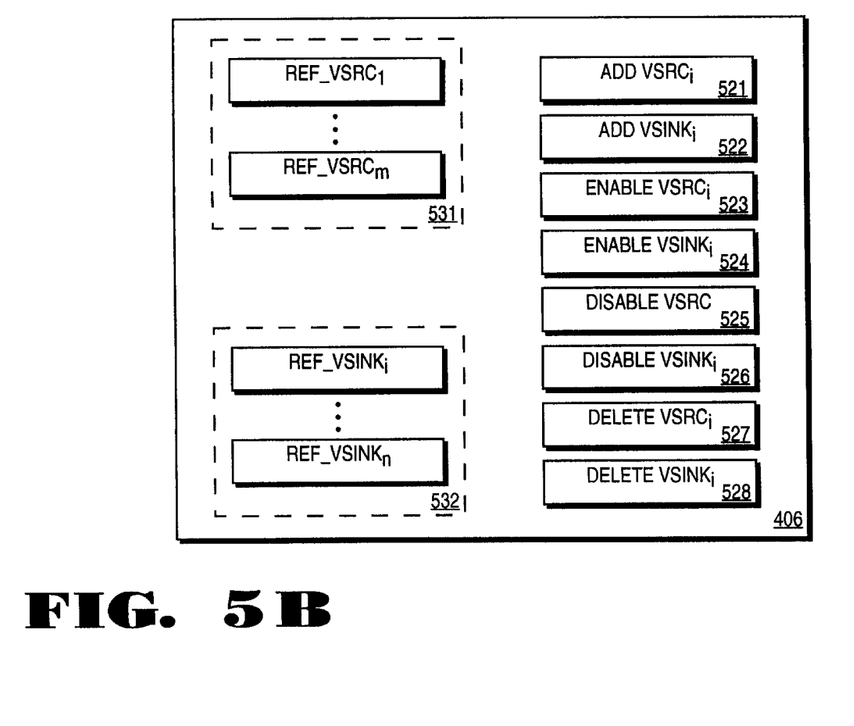

To provide the proper references to the proper entities, a video stream object 405 is created, as illustrated in FIG. 4B. The video stream object 405 coordinates the connection between video sources and video sinks but does not directly participate in video frame movement at run time. FIG. 5A shows an example of a video stream object 405 associated with the embodiment of FIG. 3A, in which a single source is connected to multiple sinks 320. A video stream object 405 is an instance of a class having several member functions 521–528. The video stream object 405 includes several data members, including a reference 511 to the video source 310 and references 512 to each of the video sinks 320. FIG. 5B shows a video stream object 406 associated with the embodiment of FIG. 3B. Video stream object 406 is essentially identical to video stream object 405, except that the video stream object 406 includes references 531 to each of the video sources 340 in addition to references 532 to each of the video sinks 350. When the video subsystem 70 is initialized, the video application invokes the member functions 521–528. The functions, which are substantially the same for both the embodiments of FIG. 3A and FIG. 3B, include: the function 522 of adding a video sink to the video stream; the function 523 of enabling a video source; the function 524 of enabling a video sink; the function 525 of disabling a video source; the function 526 of disabling a video sink; the function 527 of deleting a video source from the video stream; and, the function 528 of deleting a video sink from the video stream.

Figure 7:
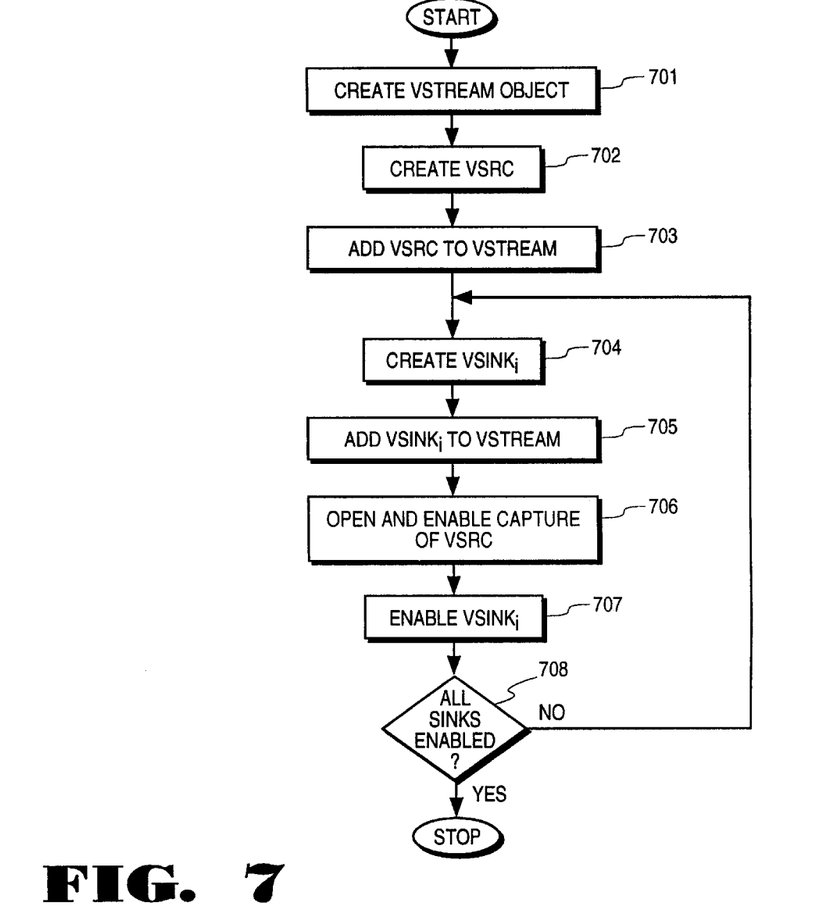
FIG. 7 is a flowchart summarizing the process of initializing a video subsystem in a computer system.

FIG. 7 shows a flowchart summarizing the steps performed in initializing the video subsystem 70 of the computer system 1. In step 701, the video application creates a video stream object 405, as defined above. In step 702, the video application creates a video source; that is, the video application opens a capture driver or specifies a type of source which is to be opened. In step 703, the video stream object 405 adds a video source to the video stream. In step 704, the video application logically creates a video sink. In step 705, the video stream object 405 adds the video sink to the video stream 300. In step 706, the video stream object 405 opens and enables capture of the video source 310. In step 707, the video stream object 405 enables a video sink which has been added to the video stream. It is during this step 707 when the passing of references to the process framehandler and recycle framehandler by the video stream object occurs in the manner described above. The steps 704 through 707 are repeated until all video sinks have been enabled (step 708).

Figure 6:
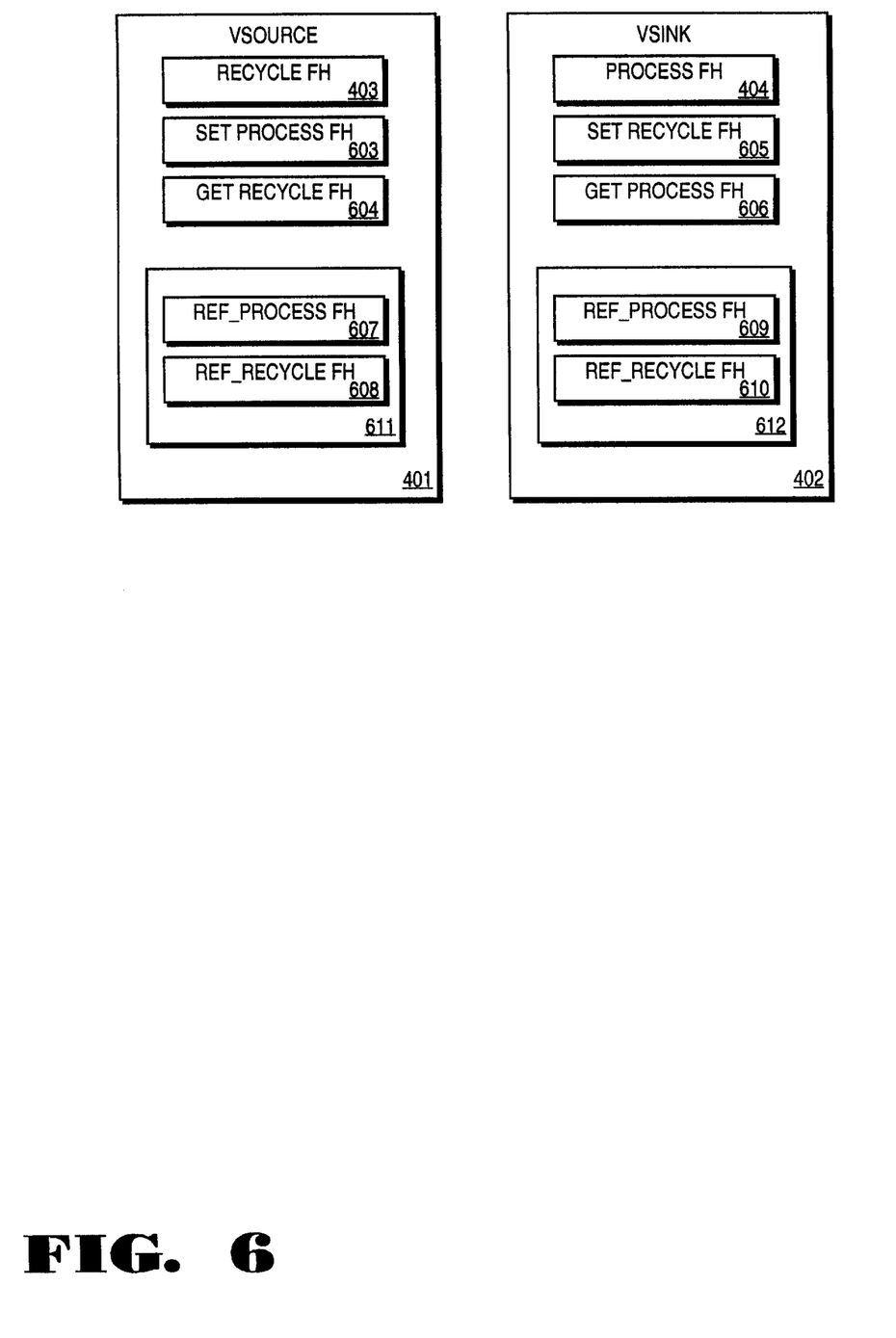
FIG. 6 illustrates video source object and a video sink object, each having a reference to a process framehandler and a reference to a recycle framehandler.

To allow the video stream object 405 to provide the proper references to the proper entity, the present invention defines four functions, two of which are exported by a video sink and two of which are exported by a video source. Referring to FIG. 6, it is now assumed that a video stream is to be established consisting of one video source 401 and one video sink 402 that supports only one frame type (such that only one process framehandler is required). The video source 401 is defined to have two member functions: a set process framehandler 603 and a get recycle framehandler 604. The video sink 402 is defined to have two member functions: a set recycle framehandler 605 and a get process framehandler 606. In addition, each video source 401 has a framehandler object 611 which includes a reference 607 to the process framehandler 404 of the video sink 402 and a reference 608 to that video source's own recycle framehandler 403. The video sink 402 has a framehandler object 612 which includes a reference 609 that sink's own process framehandler 404 and a reference 610 to the recycle framehandler 403 of the video source 401. Generally, the video stream object 405 invokes (calls) the get process framehandler 606 and the set process framehandler 603 to provide the reference to the process framehandler to the framehandler object 611 of the video source 401, and invokes the get recycle framehandler 604 and the set recycle framehandler 605 to provide the reference to the recycle framehandler to the framehandler object 612 of the video sink 402.

Figure 8:
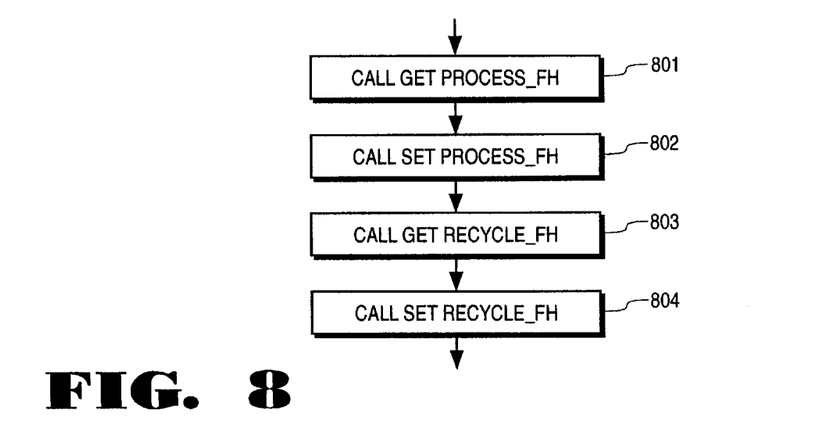
FIG. 8 is a flowchart showing the steps performed in establishing a connection between a video source and a video sink.
Figure 9A:
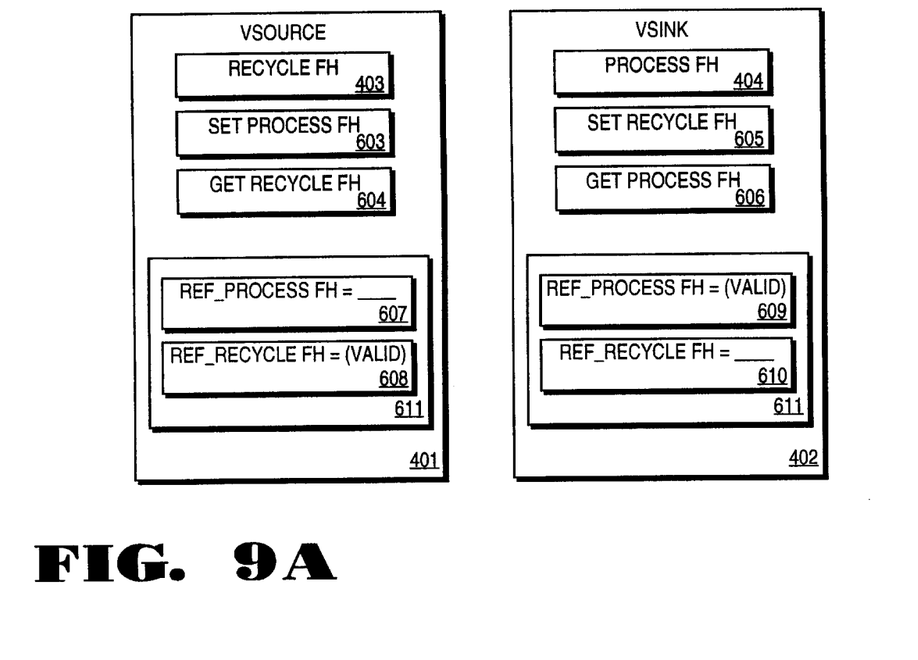
FIG. 9A illustrates video source object having a reference to a process framehandler and a video sink object having a reference to a recycle framehandler before a video connection is established between the source and the sink.
Figure 9B:
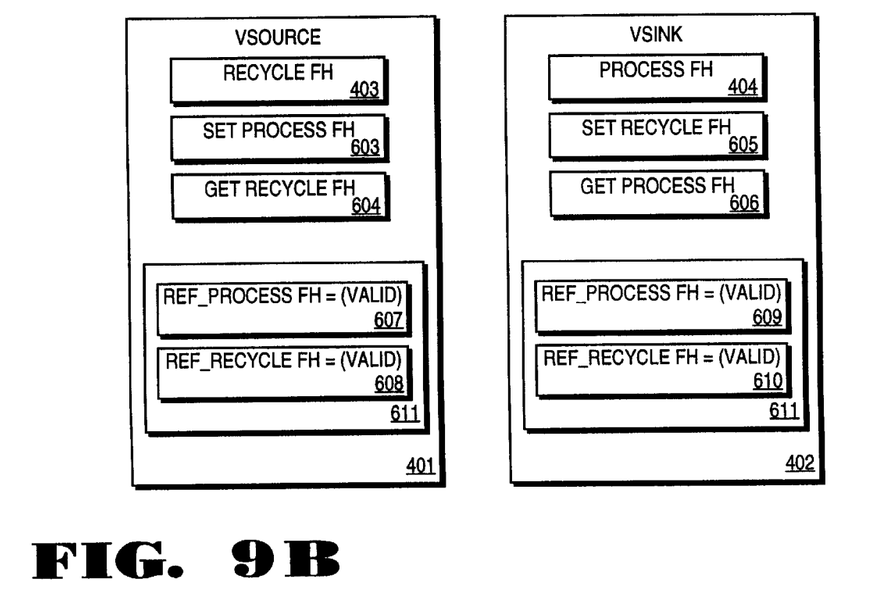
FIG. 9B illustrates video source object having a reference to a process framehandler and a video sink object having a reference to a recycle framehandler after a video connection is established between the source and the sink.

Before the video connection is established, the value of the source's reference 607 to the process framehandler and the value of the sink's reference 610 to the recycle framehandler are both null (not valid), as shown in FIG. 9A. Referring now to FIG. 8, the video stream object 405 first calls the get process framehandler in step 801 to obtain the reference 609 to the process framehandler 404 of video sink 402. In step 802, the video stream object calls the set process framehandler 603 in order to provide the reference 609 to the process framehandler 404 to the video source 401. In step 803, the video stream object 405 calls the get recycle framehandler 604 to obtain the reference 608 to the recycle framehandler 403 of the video source 401. In step 804, the video stream object 405 calls the set recycle framehandler 605 to provide the reference 608 to the recycle framehandler 403 to the video sink 402. After completion of step 804, the video source 401 has a valid reference 607 to the process framehandler 404 and the video sink 402 has a valid reference 610 to the recycle framehandler 403, as shown in FIG. 9B. Thus, a video connection has been established between the video source 401 and the video sink 402. The video source 401 can invoke the process framehandler 404 to move frames directly between the video source 401 and the video sink 402. The video sink 402 can return frame buffers directly to the video source 401 by directly invoking the recycle framehandler 403.

Figure 3C:
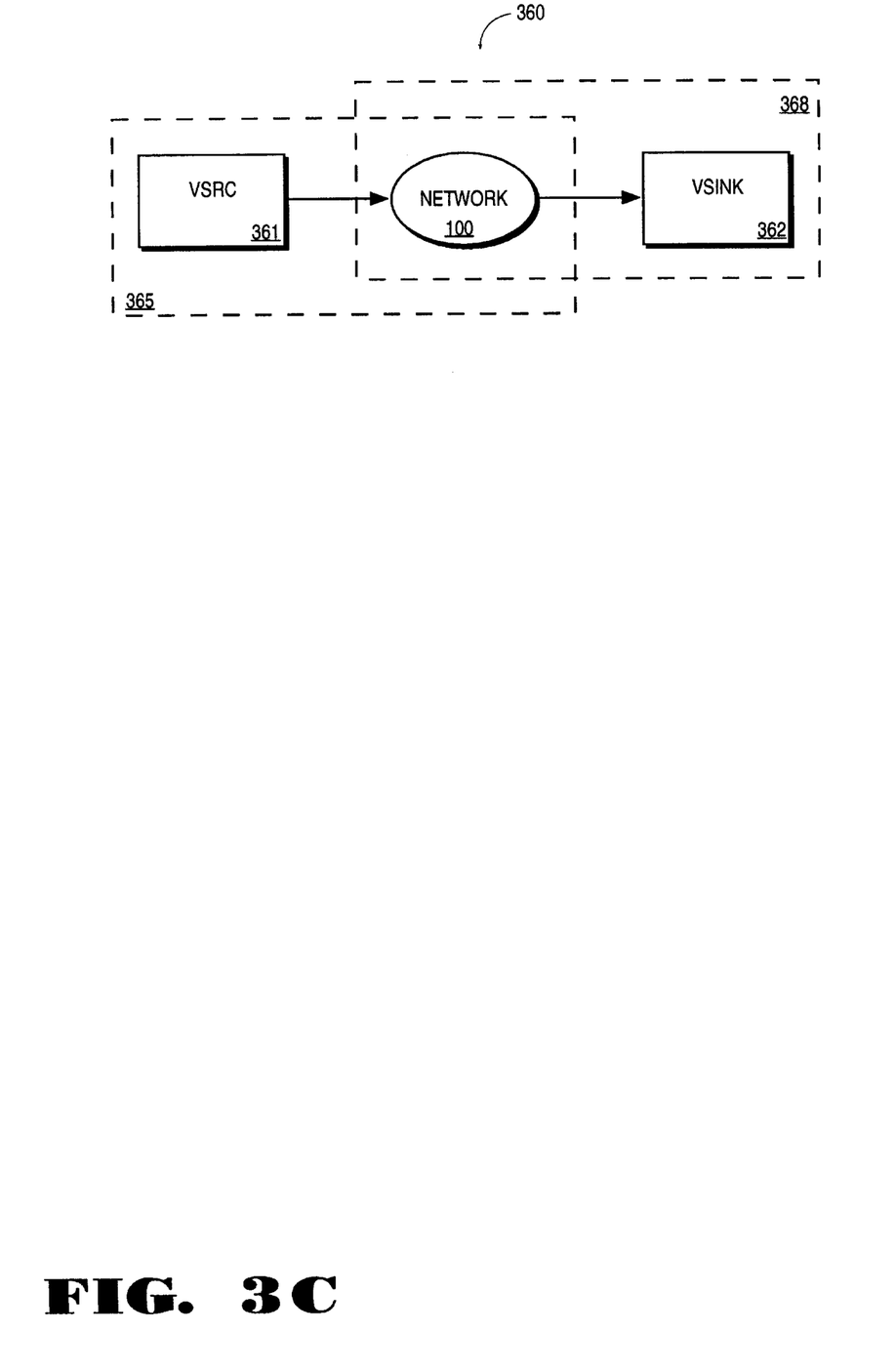
Figure 10:
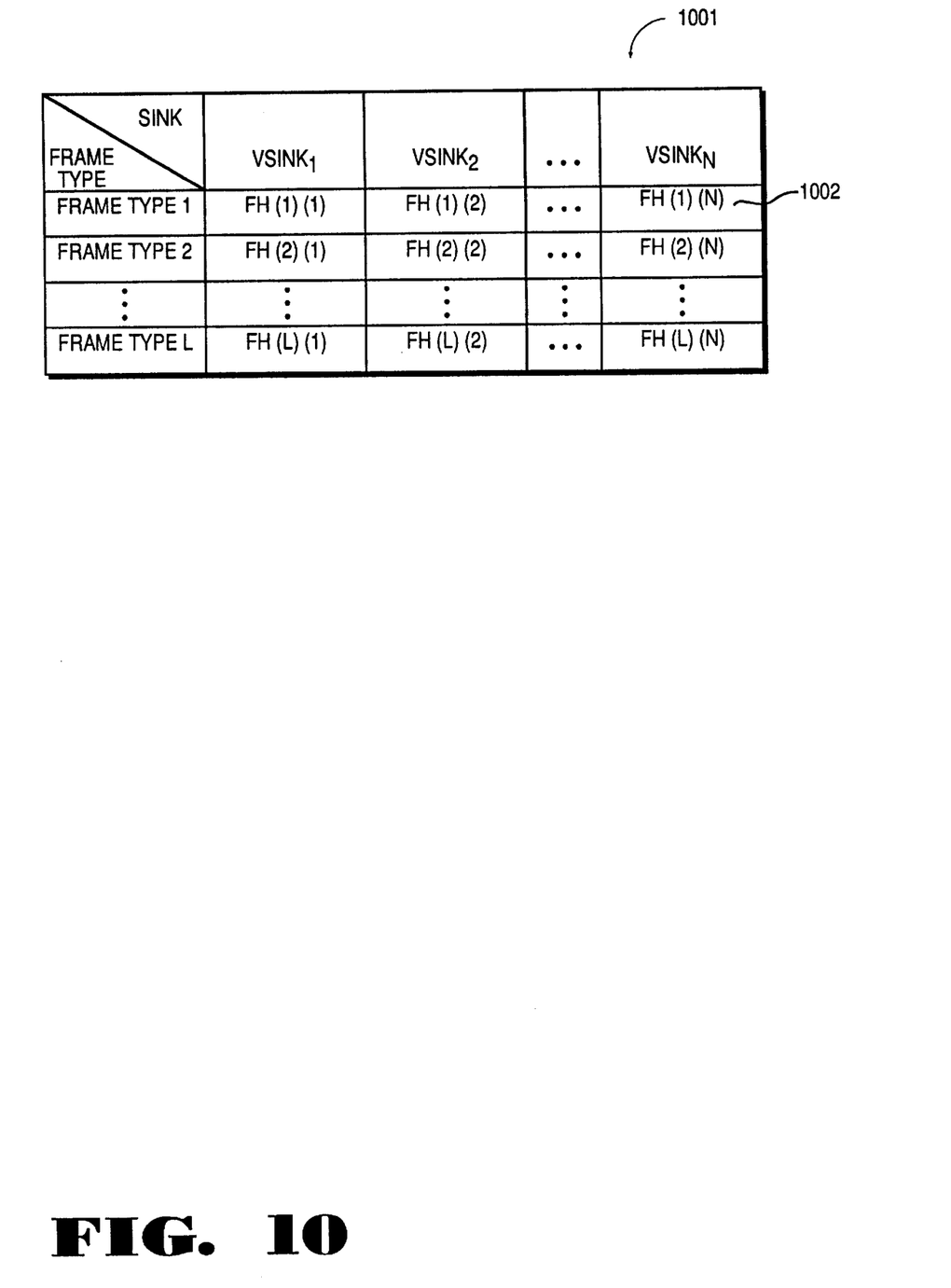
FIG. 10 illustrates a framehandler array belonging to a video source.

The connection method described above can be easily applied to a video stream having a single video source connected to multiple sinks, as shown in FIG. 3A, or to a video stream having multiple sources connected to multiple sinks, as shown in FIG. 3B. If the video stream has multiple sinks, then each video source will have multiple framehandler objects having the form of framehandler object 611, each of which will contain a reference to a process framehandler of a particular sink and the reference to the recycle framehandler of that source. Moreover, the video source object 401 will contain a separate instance of the framehandler object for each frame type supported by each video sink. Accordingly, the framehandler objects associated with the video source may be stored in the form of a framehandler array 1001, as illustrated in FIG. 10. Each entry 1002 in the framehandler array 1001 is essentially a framehandler object which includes a reference to a process framehandler for a particular frame type of a particular sink, in addition to a reference to the recycle framehandler of that source. Hence, for a video stream consisting of N sinks and L frame types, the video source has a framehandler array 1001 having (N×L) entries, although some entries need not be used if not every sink supports every frame type.

Thus, what has been described is an efficient mechanism for moving video frames from an arbitrary number of video sources to an arbitrary number of video sinks which does not require intermediate routing or copying of frames. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of creating a connection between a video source and a video sink, the video source for providing a plurality of video frames to the video sink, the video source having a recycle framehandler for recycling a plurality of buffers, the video sink having a process framehandler for processing the frames, the method comprising:

providing the video source with a reference to the process framehandler of the video sink; and providing the video sink with a reference to the recycle framehandler of the video source.

2. The method of claim 1, wherein providing the video source with the reference to the process framehandler comprises storing the reference to the process framehandler as a data member of a first framehandler object to be used by the video source, and wherein providing the video sink with the reference to the recycle framehandler comprises storing the reference to the recycle framehandler as a data member of a second framehandler object to be used by the video sink.

3. The method of claim 1, further comprising providing a video stream object for executing said obtaining the reference to the process framehandler, said providing the reference to the process framehandler, said obtaining the reference to the recycle framehandler, and said providing the reference to the recycle framehandler.

4. The method of claim 1, further comprising:
providing a video stream object;
providing a first member function and a second member function of the video source; and
providing a third member function and a fourth member function of the video sink;
wherein the video stream object initiates said obtaining the reference to the process framehandler and said providing the video source with the reference to the process framehandler by invoking the first member function and the third member function, and wherein the video stream object initiates said obtaining the reference to the recycle framehandler and said providing the video sink with the reference to the recycle framehandler by invoking the second member function and the fourth member function.

5. The method of claim 1, wherein the video source is one of a file, a camera, a television tuner, a computer network, and a telephony interface.

6. The method of claim 1, wherein the video sink is one of a file, a visual display device, a computer network, and a telephony interface.

7. A method of creating an interface between a video source and a video sink, the video source having a recycle framehandler for recycling a plurality of buffers, the buffers for storing a plurality of frames, the video sink having a process framehandler for processing the frames, the video sink further having a first plurality of member functions including a first framehandler and a second framehandler, the video source further having a second plurality of member functions including a third framehandler and a fourth framehandler, the method comprising the steps of:
invoking the first framehandler to obtain a reference to the process framehandler;
invoking the third framehandler to provide the reference to the process framehandler to the video source;
invoking the fourth framehandler to obtain a reference to the recycle framehandler; and
invoking the second framehandler to provide the reference to the recycle framehandler to the video sink.

8. The method of claim 7, further comprising the step of creating a plurality of framehandler objects, a first one of the framehandler objects including a reference to the process framehandler and a second one of the framehandler objects including a reference to the recycle framehandler.

9. The method of claim 8, wherein the plurality of framehandler objects comprises a framehandler table, the framehandler table including a subset of the plurality of framehandler objects, the subset allocated for use by the video source.

10. The method of claim 7, further comprising the step of creating a video stream object, the video stream object for invoking the first, second, third, and fourth framehandlers.

11. The method of claim 7, wherein the video source is one of a file, a camera, a television tuner, a computer network, and a telephony interface.

12. The method of claim 7, wherein the video sink is one of a file, a visual display device, a computer network, and a telephony interface.

13. A method of defining a connection between a video source and a plurality of video sinks, each of the video sinks supporting at least one of a plurality of possible frame types, the video sinks having a plurality of process framehandlers for processing frames, one process framehandler for each frame type supported by each video sink, the method including the steps of:
allocating a plurality of buffers for control by the video source, the buffers for storing a plurality of frames to be deposited into the video sinks, the video source having a recycle framehandler for recycling the buffers;
creating a plurality of framehandler objects, the plurality of framehandler objects including a first plurality of framehandler objects for use by the video source and a second plurality of framehandler objects for use by the video sinks, wherein there is one framehandler object in the first plurality of framehandler objects for each process framehandler;
obtaining a first plurality of references from the video sinks, each of the first plurality of references pointing to one of the process framehandlers;
providing each of the first plurality of references to the video source, such that each of the first plurality of framehandler objects includes one of the first plurality of references;
obtaining a reference to the recycle framehandler from the video source; and
providing the reference to the recycle framehandler to each of the video sinks such that each of the second plurality of framehandler objects includes the reference to the recycle framehandler, wherein the video source may directly invoke any of the process framehandlers by using one of the references stored in the first plurality of framehandler objects, and wherein each of the video sinks may directly invoke the recycle framehandler by using the reference to the recycle framehandler stored in each of the second plurality of framehandler objects.

14. The method of claim 13, wherein the video source is one of a file, a camera, a television tuner, a computer network, and a telephony interface.

15. The method of claim 14, wherein the video sink is one of a file, a visual display device, a computer network, and a telephony interface.

16. The method of claim 13, wherein the first plurality of framehandler objects comprises a framehandler table.

17. An apparatus for creating an interface between a video source and a plurality of video sinks, the video source having a recycle framehandler for recycling a plurality of buffers, each of the video sinks having one of a plurality of process framehandlers for processing video frames, the apparatus comprising:
means for providing the video sink with a first plurality of member functions including a first function and a second function;
means for providing the video source with a second plurality of member functions including a third function and a fourth function;
means for invoking the first function to obtain a reference to each of the process framehandlers;
means for invoking the third function to provide the references to the process framehandlers to the video source;

means for invoking the fourth function to obtain a reference to the recycle framehandler; and means for invoking the second function to provide the reference to the recycle framehandler to the video sinks, such that the video source may invoke the process framehandlers and the video sink may invoke the recycle framehandler, such that the video frames can be moved directly between the video source and one or more of the video sinks.

18. The apparatus of claim 17, further comprising means for providing a first plurality of framehandler objects for use by the video source, each of the first plurality of framehandler objects including one of the references to one of the process framehandlers.

19. The apparatus of claim 18, wherein the video sources support a plurality of frame types, and wherein the first plurality of framehandler objects includes one framehandler object for each frame type supported by each of the sources.

20. The apparatus of claim 18, further comprising means for providing a second plurality of framehandler objects for use by the video sinks, each of the second plurality of framehandler objects including the reference to the recycle framehandler.

21. The apparatus of claim 18, wherein the first plurality of framehandler objects comprises a framehandler table.

22. The apparatus of claim 17, further comprising means for creating a video stream object for invoking the first, second, third, and fourth functions.

23. The apparatus of claim 17, wherein the video source is one of a file, a camera, a television tuner, a computer network, and a telephony interface.

24. The apparatus of claim 17, wherein the video sink is one of a file, a visual display device, a computer network, and a telephony interface.

25. An apparatus for establishing an interface between a video source for depositing a plurality of video frames into a video sink, the video sink having a process framehandler function for processing the frames, the apparatus comprising:

first logic coupled to the video source, the first logic providing a plurality of buffers for storing the frames, the buffers for control by the video source, wherein the video source has a recycle framehandler function for recycling the buffers;

second logic coupled to the video sink, the second logic obtaining a reference to the process framehandler function;

third logic coupled to the second logic, the third logic providing the reference to the process framehandler function to a first framehandler object for use by the video source;

fourth logic coupled to the video source, the second logic obtaining a reference to the recycle framehandler function; and fifth logic coupled to the fourth logic, the fifth logic providing the reference to the recycle framehandler function to a second framehandler object for use by the video sink, such that the video source may directly invoke the process framehandler function and the video sink may directly invoke the recycle framehandler function.

26. The apparatus of claim 25, wherein the third logic stores the reference to the process framehandler function as a data member of the first framehandler object, and wherein the fifth logic stores the reference to the recycle framehandler function as a data member of the second framehandler object.

27. The apparatus of claim 25, further comprising sixth logic coupled to the video source and the video sink, the sixth logic providing a video stream object including a plurality of member functions and at least one data member, wherein the at least one data member includes a reference to the video source and a reference to the video sink, and wherein the second logic, the third logic, the fourth logic, and the fifth logic each perform one of the member functions.

28. The apparatus of claim 25, wherein the video source is one of a file, a camera, a television tuner, a computer network, and a telephony interface, and wherein the video sink is one of a file, a visual display device, a computer network, and a telephony interface.

29. A computer system having an interface between a video source and a plurality of video sinks, the video source having a recycle framehandler, each of the video sinks having one of a plurality of process framehandlers, the computer system including a processor, a memory, and an apparatus for creating the interface, the apparatus comprising:

means for providing the video source with a first plurality of member functions and for providing the video sink with a second plurality of member functions, the first plurality of member functions including a set process framehandler function and a get recycle framehandler function, the second plurality of member functions including a get process framehandler function and a set recycle framehandler function;

means for invoking the get process framehandler function to obtain a reference to each of the process framehandlers;

means for invoking the set process framehandler to provide the references to the process framehandlers to the video source;

means for invoking the get recycle framehandler to obtain a reference to the recycle framehandler; and means for invoking the set recycle framehandler to provide the reference to the recycle framehandler to the video sinks, such that the video source may invoke the process framehandlers and the video sink may invoke the recycle framehandler, such that the frames can be moved directly between the video source and one or more of the video sinks.

30. The apparatus of claim 29, further comprising means for providing a first plurality of framehandler objects for use by the video source, each of the first plurality of framehandler objects including one of the references to one of the process framehandlers.

31. The apparatus of claim 30, further comprising means for providing a second plurality of framehandler objects for use by the video sinks, each of the second plurality of framehandler objects including the reference to the recycle framehandler.

32. The method of claim 1, further comprising:
obtaining the reference to the process framehandler from the video sink prior to providing the video source with the reference to the process framehandler; and obtaining the reference to the recycle framehandler from the video source prior to providing the video sink with the reference to the recycle framehandler.

33. A method of creating a connection between a video source and a video sink, the video source for providing a plurality of video frames to the video sink, the video source having a recycle algorithm for recycling a plurality of buffers, the video sink having a process algorithm for processing of the frames, the method comprising:

providing the video source with an indication of the location of the process algorithm of the video sink; and providing the video sink with an indication of the location of the recycle algorithm of the video source.

34. The method of claim 33, further comprising:

obtaining the indication of the location of the process algorithm from the video sink prior to said providing the video source with the indication of the location of the process algorithm; and obtaining the indication of the location of the recycle algorithm from the video source prior to said providing the video sink with the indication of the location of the recycle algorithm.

35. The method of claim 34, wherein:

providing the video source with the indication of the location of the process algorithm comprises storing the indication of the location of the process algorithm as a data member of a first object for use by the video source; and providing the video sink with the indication of the location of the recycle algorithm comprises storing the indication of the location of the recycle algorithm as a data member of a second object for use by the video sink.

36. The method of claim 35, further comprising:

creating a third object; and using the third object to perform at least one of said obtaining the indication of the location of the process algorithm, said providing the indication of the location of the process algorithm, said obtaining the indication of the location of the recycle algorithm, and said indication of the providing the location of the recycle algorithm.

* * * * *